April 26, 1938.    G. C. PEARSON    2,115,231
ROCK DRILL
Filed Aug. 30, 1937    5 Sheets-Sheet 1

INVENTOR.
GUSTAV C. PEARSON
BY
J. J. Carpenter
ATTORNEY.

April 26, 1938.    G. C. PEARSON    2,115,231
ROCK DRILL
Filed Aug. 30, 1937    5 Sheets-Sheet 2

INVENTOR.
GUSTAV C. PEARSON
BY
ATTORNEY.

April 26, 1938.　　　　G. C. PEARSON　　　　2,115,231
ROCK DRILL
Filed Aug. 30, 1937　　　5 Sheets-Sheet 3

INVENTOR.
GUSTAV C. PEARSON
BY
ATTORNEY.

April 26, 1938.  G. C. PEARSON  2,115,231
ROCK DRILL
Filed Aug. 30, 1937  5 Sheets-Sheet 4

Fig. 11

INVENTOR.
GUSTAV C. PEARSON
BY
ATTORNEY.

April 26, 1938.   G. C. PEARSON   2,115,231
ROCK DRILL
Filed Aug. 30, 1937   5 Sheets-Sheet 5

INVENTOR.
GUSTAV C. PEARSON
BY
ATTORNEY.

Patented Apr. 26, 1938

2,115,231

UNITED STATES PATENT OFFICE 2,115,231

ROCK DRILL

Gustav C. Pearson, Denver, Colo., assignor to Gardner-Denver Company, Denver, Colo., a corporation of Delaware Application August 30, 1937, Serial No. 161,535

17 Claims. (Cl. 121—9)

This invention relates to improvements in rock drills and is more particularly directed to means for automatically feeding such drills to and from the work.

The object of the present invention is to provide a novel and efficient means, independent of any action of the drilling unit, for feeding such a unit to and from its work. Broadly, the invention is similar to that disclosed in the patent to Pearson and Carpenter No. 2,086,634 of July 13, 1937.

Another object of the invention is to provide a fluid actuated means under full control of the operator for moving a drilling unit longitudinally upon its support.

Still another object of the invention is to provide fluid operated means for moving a rock drill upon its support, said means being adapted to move the drill in any longitudinal direction, to lock the drill against movement, and to free the drill so that it might be moved freely by hand upon the support.

Another object of the invention is to provide automatic feeding means for a drill employing the usual feed screw. The feed screw, however, in this specific embodiment being stationary and with which fluid operated means cooperate to move the drill longitudinally upon the support.

With the invention disclosed herein, automatic means is provided for feeding a drill operable at such periods as to assure the correct striking relation between the drill hammer and the steel.

A further object of the invention is to provide means associated with the fluid actuated means permitting control of the piston imparting movement to the unit.

Further objects of the invention will be apparent from the description made hereinafter, and to all of these ends the invention consists of the features of construction, arrangement of parts, and combination of elements substantially as described in the specification, claimed and shown in the accompanying drawings, in which:

Briefly, the invention herein about to be described contemplates the provision of a fluid operated mechanism including a reciprocating piston, said mechanism adapted to be associated with a rock drill to move the same to and from its work. It will, of course, be understood that in the operation of the drill as the steel advances into the rock it is the purpose of the feeding device to automatically feed the drill forward, maintaining it in such a position with respect to the work as to insure the proper striking relation of the usual drill hammer with the steel. In the accompanying drawings the device as shown is a part of the drill, this is merely one adaptation. It is readily apparent that the feeding device may be wholly independent of the drill and connected thereto in any suitable manner. It may merely slide upon the support and abut the drill feeding it forward, or it may be directly connected to the feed screw whereby rotary movement is imparted to the feed screw itself for feeding the drill to and from its work.

In the present embodiment, the feeding device includes a cylinder having therein a reciprocating piston, the movements of which are controlled by an automatic valve of any desired structure. As shown in the drawings the device is slidable in the guideways of a support, in rear of the drill, and is provided with two sets of pawl and ratchet mechanisms, both sets being mounted in the feeding device and both being utilized in transmitting motion from a reciprocating piston to a rotatable sleeve in threaded engagement with the stationary feed screw. It is through the medium of the ratchets and pawls that directional movement of the drill, and feeding device, longitudinally upon the support is accomplished.

It is further obvious that the pawls engageable with the ratchets are controlled at the will of the operator and they may be moved with respect thereto so as to cause the unit to move either forward or rearward.

Furthermore, the pawls may be so regulated as to permit manual movement of the drill and device in either direction upon the support.

Figure 14:
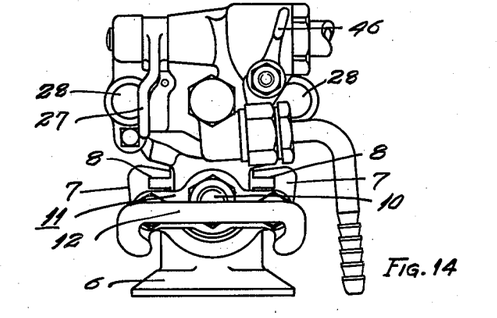
Figure 14 is a rear end view of the mechanism as shown in Figure 1.

Referring to the drawings in detail, the numeral 5 indicates a conventional guide shell having the usual cone 6 by which the shell may be suitably secured to any type of mounting. As shown in Figure 14, the shell includes upstanding side walls 7, the inner faces of which are provided with longitudinally extending grooves 8 constituting guideways in which the rock drill and its feeding device, hereinafter described, are positioned for longitudinal movement. As usual, the shell has affixed to its rear end the conventional two bar extension indicated at 9.

Figure 2:
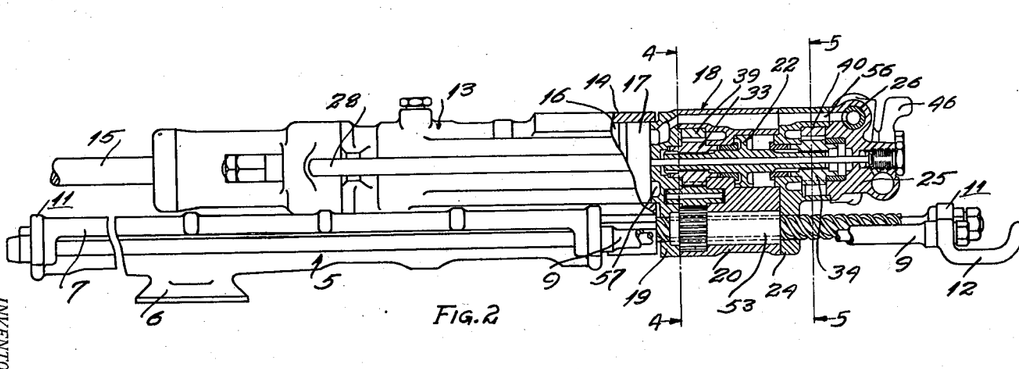
Figure 2 is a side elevation of Figure 1 showing in section the fluid operated means for moving the drill longitudinally of the support.
Figures 3, 15:
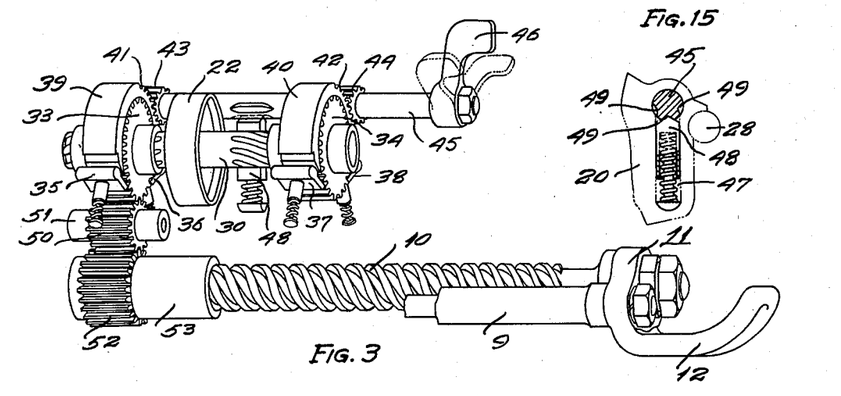
Figure 3 is a diagrammatic view illustrating the mechanism employed for transmitting power from a reciprocating piston to a rotatable sleeve slidable upon a stationary feed screw and forming a part of the mechanism.
Figure 15 is a fragmentary view showing the means for locking the control shaft 45 in either one of its functioning positions.

The guide shell 5 is further provided with a longitudinally positioned threaded shaft 10, as shown in Figures 2 and 3, the shaft being rigidly maintained against movement by front and rear yokes 11 the first being secured to the end faces of the upstanding walls 7 while the second is mounted upon the extreme end portions of the two bar extension 9. The latter yoke 11 is provided with a rearwardly extending handle 12 which may be grasped by the operator when moving the unit, and particularly when aligning the unit with the work.

Figure 1:
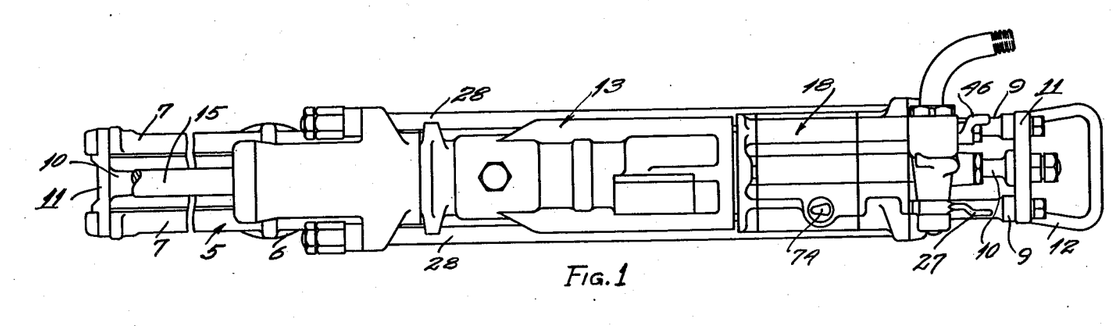
Figure 1 is a top plan view of a rock drill mounted upon a support and having connected thereto one embodiment of the feeding device constituting the present invention.

In Figures 1 and 2 a rock drill 13 is shown of any desired construction mounted for movement in the guide shell 5. In the present embodiment the drill includes a cylinder 14 having the usual outstanding flanges, not shown, slidably engaging the guideways 8 of the shell 5. The cylinder has positioned therein the usual reciprocating piston hammer, not shown, intended to impart blows to a drill steel 15 supported in the front end of the drill. The movement of the hammer being controlled by an automatic valve of any desired structure, the chest of which is positioned within the rear end of the cylinder 14 and indicated briefly at 16. In rear of the valve chest 16 the cylinder 14 has positioned therein the usual ratchet means indicated at 17 for imparting rotary movement to the hammer and ultimately to the steel 15. To move the drill 13 longitudinally of the shell 5 there is arranged, in rear of the cylinder 14, a complete fluid operated motor generally indicated at 18.

Referring more particularly to the structures shown in Figures 2 and 3 there is provided in rear of the cylinder 14 an end plate 19 against which abuts a casing 20 having a cylindrical chamber 21 within which a piston 22 reciprocates, the movement of which being controlled by an automatic valve 23 of any desired type mounted for movement within a chamber also formed in the casing 20. Abutting the rear end of the casing 20 is a back plate 24, and fitting upon the rear face of this is a backhead 25 provided with the usual throttle valve 26 having an operating handle 27. The usual air and water connections are, of course, arranged upon the backhead, all of which are conventional and need no further description. In the assembly of the various elements forming the feeding mechanism, such as the end plates 19 and 24, the casing 20 and the backhead 25, all are secured in line with the drill 13 by the side rods 28 likewise serving the same purpose in the drill assembly.

Figure 10:
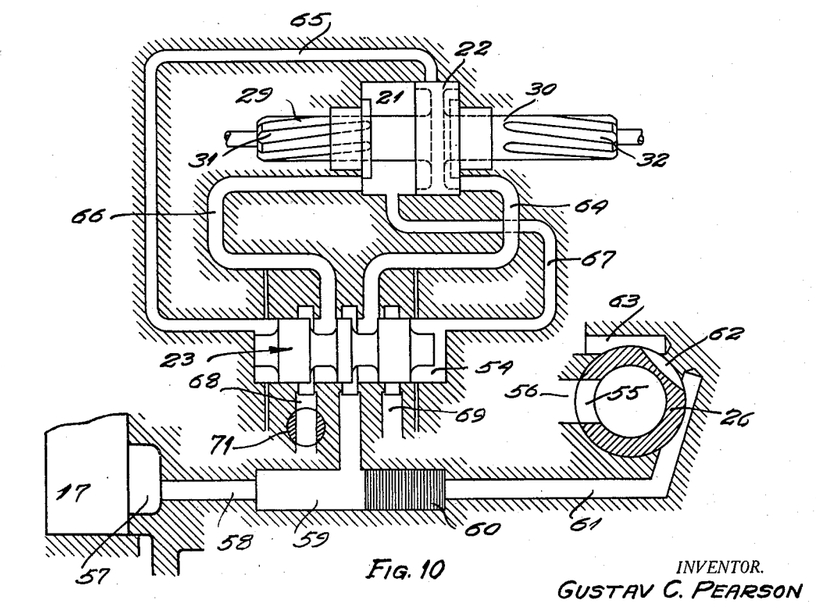
Figure 10 is a diagrammatic view illustrating one form of an automatic valve for controlling the movement of the reciprocating piston in the feeding device. It also shows the position occupied by the throttle valve when the drilling unit and the feeding device are both operating.

The reciprocating piston 22 of the feeding device, as shown in Figure 10, is provided with oppositely projecting stems 29 and 30, both of which have formed in their peripheries spiral flutes. The stem 29 has its flutes 31 cut oppositely to those formed upon the face of the stem 30 and indicated at 32.

Figures 4, 8:
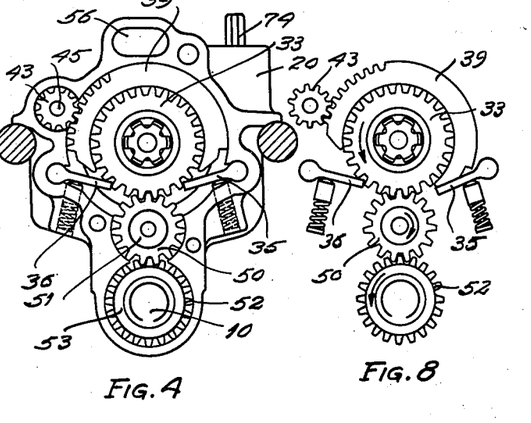
Figure 4 is a sectional view of the line 4—4 of Figure 2 showing the arrangement of the front ratchet and pawl mechanism together with the controlling element for the pawls, whereby directional movement of the drill upon the support is controlled.
Figure 8 is a view taken on the line 4—4 showing the position assumed by the front pawls and their controlling element when the drill is being moved to the work by the fluid operated means.

Positioned within the casing 20 and abutting the rear face of the plate 19 is a ratchet wheel 33, the hub of which is interiorly fluted to receive the fluted stem 29 of the piston 22. Likewise, the fluted stem 30 of the piston 22 is engageable with a second ratchet 34 positioned within the end plate 24. Engageable with the periphery of the ratchet wheel 33 are spring pressed pawls 35 and 36, while the ratchet 34 is similarly engaged by spring pressed pawls 37 and 38. Normally, as shown in Figure 3, all pawls are engageable with the peripheries of the ratchet wheels 33 and 34. However, to control the engagement of these pawls with their respective ratchet wheels, there is provided about each ratchet wheel an oscillating ring segment. As an example, the ratchet wheel 33 has positioned thereover a ring segment 39, the ends of which, as shown in Figure 4, are bevelled so that they might engage either one of the pawls 35 or 36 and move them to the various positions shown in Figures 4, 6 and 8. Likewise, positioned over the ratchet wheel 34 is a ring segment 40 controlling the engagement of the pawls 37 and 38 with the ratchet wheel, the ring segment 40 being similar in construction to 39.

To control the oscillatory movement of the ring segments 39 and 40, each are provided on corresponding portions with external racks or the like 41 and 42 with which gears 43 and 44 positioned upon an oscillatory control shaft 45 engage. The shaft 45 is supported and mounted for movement within the elements forming the housing of the feeding device, and its movement is controlled by an operating handle 46. In order to maintain the control shaft 45 in any one of its several functioning positions there is provided within the casing 20, between the gears 43 and 44, a socket 47 having therein a spring projected plunger 48 the end of which is adapted to engage either one of three longitudinal slots 49 formed about the axis of the shaft 45.

The front ratchet wheel 33 and the rear ratchet wheel 34 serve not only as a means whereby directional movement of the feeding device might be controlled, but as the means for transposing the reciprocatory movement of the piston 22 to a rotary movement for moving the drill longitudinally upon the support. To accomplish this, the ratchet wheel 33 is geared to a smaller gear 50 formed integral with a stud shaft 51 journaled within the abutting faces of the end plate 19 and the casing 20. This gear 50 in turn meshes with a second gear 52 formed exteriorly about a sleeve 53 journaled for rotary movement within a bore formed in the casing 20 and maintained in place, and partly supported, by the end plates 19 and 24. The sleeve 53 is interiorly threaded to receive therein the threaded feed screw 10 rigidly supported by the guide shell 5.

To control the movement of the motion imparting piston 22 there is, as previously stated, a control valve 23 positioned within the chamber 54 formed in the intermediate casing 20 and closed by the end plate 24. Referring to Figure 10, which is a diagrammatic view of the valve mechanism including the piston 22 and the throttle valve 26 positioned within the backhead 25, motive fluid flows from the throttle valve 26 through a port 55 into a passage 56 extending longitudinally of the feeding device and leading to a chamber 57 formed within the rear end of the cylinder 14, as disclosed in Figure 2. Motive fluid from the chamber 57 then passes to the valve chest 16 operating the valve therein, and in turn causes the piston hammer within the drill 13 to reciprocate and strike the steel 15. Likewise, motive fluid passes from the chamber 57 through a passageway 58 to an enlarged bore 59 having positioned therein a movable plug 60 acted upon by motive fluid impinging upon either one of its end faces. When the plug is in the position as shown in Figure 10 a continuation of the passageway 58, indicated at 61, is open to atmosphere through a groove 62 formed in the periphery of the throttle valve, and a passageway 63 opening to atmosphere. In other words, the plug 60 as shown in Figure 10 cuts off the escape of motive fluid through the passageway 61, groove 62 and passageway 63 to atmosphere. With the plug in this position motive fluid entering passageway 58 flows into the enlarged bore 59 and then into the valve chest or chamber 54 within which the control valve 23 is positioned. The valve 23 and plug 60, as shown in Figure 10, are in positions permitting the passage of motive fluid from the supply passageway 58 into a passageway 64 leading to the rear face of the piston 22, moving the same forwardly. Such movement continues until a trip passageway 65 is placed in communication with the supply passage 64 through chamber 21 by the piston 22, thus permitting motive fluid to pass from the piston chamber 21 to the front face of the valve 23, tripping the same to its second position, just the reverse of that shown in Figure 10. With the valve 23 in this reversed position, motive fluid then passes from the enlarged passageway 58 into a passageway 66 leading to the front face of the piston 22, thus moving the piston rearwardly until the trip passage 67 is uncovered, whereby motive fluid is then admitted to the rear face of the valve 23 throwing the same back to the position illustrated in Figure 10. After the valve 23 has been tripped to either of its functioning positions exhaust from the chamber 21 passes through either the passageway 66 or 64, controlled by the valve, to atmosphere through either one of the exhaust passageways 68 or 69 both of which lead to a common outlet in the casing 20. The cycle of operation then repeats itself.

The operation of the valve here above described is that assumed when both the feeding mechanism and the hammer are operating.

Figure 11:
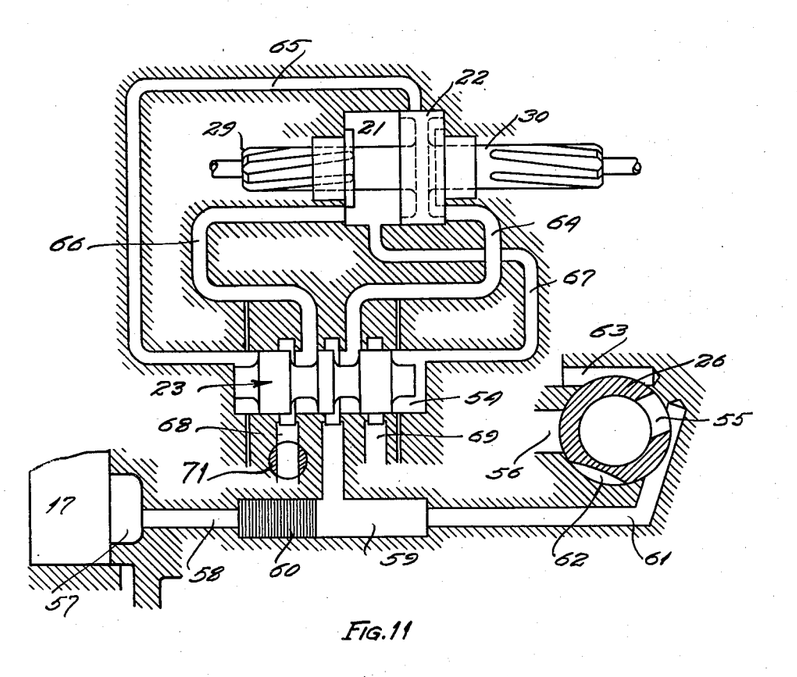
Figure 11 is a view similar to Figure 10, showing the position of the throttle valve when the feeding device is operating and the drilling unit is idle.

At some periods in the operation of the unit it is highly desirable to cut off the operation of the drilling unit and continue the operation of the feeding mechanism. To do this, the throttle valve 26, as shown in Figure 10, is moved to its second position, that indicated in Figure 11, whereupon it will be observed that the port 55 formed within the body of the throttle valve 26 is turned so that motive fluid may pass directly to the passageway 61. Assuming that the plug 60 occupies the position shown in Figure 10 when the throttle valve 26 is moved to the position illustrated in Figure 11, motive fluid upon initially entering passage 61 will impinge upon the rear face of the plug 60 moving it to the second of its positions, that shown in Figure 11, thus cutting off the possibility of fluid entering the drilling motor by means of the passageway 58. Obviously, motive fluid will then pass into the valve chamber 54 operating the valve 23 in a manner hereinbefore described. It is, of course, apparent that when the throttle valve 26 is in the position shown in Figure 11, the passageway 56 leading from the throttle valve chamber to the chamber 57 formed within the rear end of the cylinder 14 is closed, thus causing the drilling motor to remain idle.

Assuming now that the feeding mechanism as shown in Figure 2 is in a position whereby movement of the feeding device and drill upon the guide shell is prevented. To accomplish this the various pawls engageable with the ratchet wheels 33 and 34 occupy the positions shown in Figures 3, 4 and 5, whereby movement of the ratchet wheels in any direction is prevented. It is, of course, understood that when the pawls occupy such a position motive fluid to the valve 23 is cut off.

Figures 5, 9:
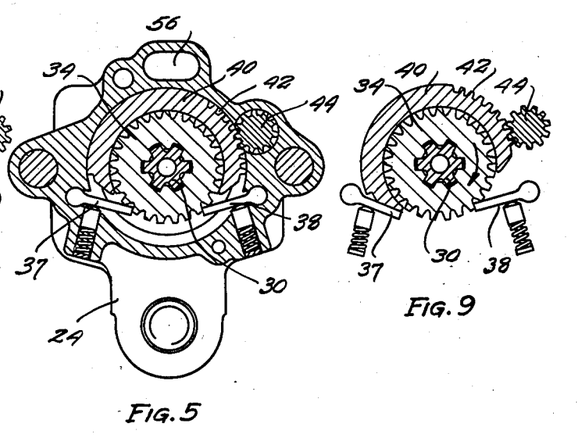
Figure 5 is a sectional view on the line 5—5 of Figure 2, similar to Figure 4, but showing the rear ratchet and pawl mechanism.
Figure 9 is a view showing the position occupied by the pawls engageable with the rear ratchet when the drill is moved toward its work.

Should it now be desired to feed the rock drill toward its work the operator grasps the control handle 46 moving the ring segments 39 and 40 to the positions shown in Figures 8 and 9, whereby the pawls 35 and 37 are thrown out of engagement with their respective ratchets, leaving the pawls 36 and 38 engageable therewith. Motive fluid is then either admitted to both the rock drill and the feeding device, or to the feeding device solely, at which time, assuming the parts to be in the position shown in Figure 10, motive fluid will impinge upon the rear face of the piston 22 moving the same forward.

It is during the forward movement of the piston 22, in this instance, when rotary movement is imparted to the sleeve 53. To accomplish this the ratchets 33 and 34 with their coacting pawls have been provided. During the forward movement of the piston a slight rotary movement is given the piston and its extensions 29 and 30 by reason of the fact that the right hand flutes 32 splined to the hub of the ratchet 34 which would normally rotate the ratchet 34 in a clockwise direction should the piston move in a straight line, but such is not the case inasmuch as the pawl 38 engages the ratchet 34 and prevents such imaginary movement. The result, therefore, is that a counterclockwise rotary movement, as indicated by the arrows in Figures 8 and 9, is given the piston 22 and its extensions 29 and 30. This rotary movement, plus the reciprocating movement, of the piston 22 and its extension 29 imparts, by reason of the left hand flutes on the extension 29, a counterclockwise movement of the ratchet 33. This is permitted, inasmuch as the pawl 36 engages the ratchet, while the pawl 35 is held out by the ring segment 39. Such a movement of the ratchet 33 gives to the gear 50 a clockwise movement, and this in turn rotates the gear 52 and the sleeve 53 counterclockwise. Due to the threaded engagement of the sleeve 53 with the shaft 10, movement of the drill and feeding device forwardly of the guide shell 5 is accomplished. From this structure it will be observed that inasmuch as the fluted stem 29 rotates during its forward movement and by reason of the angle upon which its flutes 31 are formed, the speed at which the ratchet wheel 33 moves is greatly increased. The small gear 50 positioned between the ratchet 33 and the gear 52 further increases the speed at which the sleeve 53 rotates.

Figure 12:
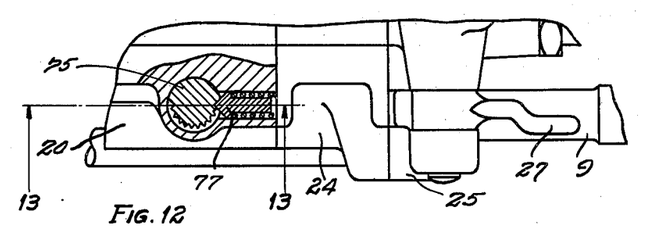
Figure 12 is a detailed view showing the control means for regulating the exhaust from the automatic valve of the feeding mechanism.
Figure 13:
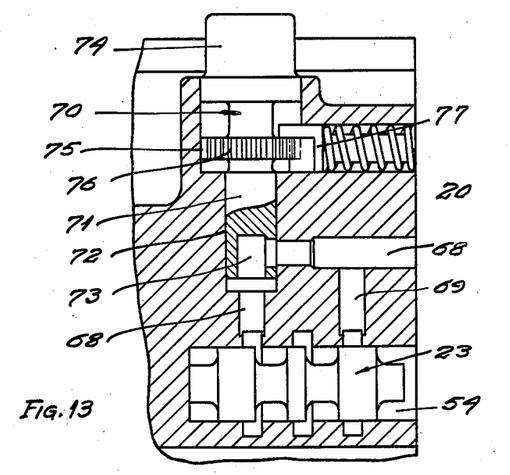
Figure 13 is a sectional view taken on the line 13—13 of Figure 12.

Movement of the piston 22 continues in a forward direction at a speed controlled by the advancement of the drill steel into its work. In other words, should the ground be relatively soft and advancement of the drill is not restricted, movement of the piston 22 would be rather rapid, on the other hand should the ground be hard, offering considerable resistance to the advancement of the steel, movement of the piston 22 will, of course, be very slow. At some periods of operation, and particularly due to the character of work, it becomes necessary to reduce the speed at which the sleeve 53 rotates. This is accomplished by controlling the movement of the piston 22. In Figures 10, 12 and 13 there is disclosed a manually adjusted plug valve or the like 70 positioned within the casing 20 and serving to regulate the escape of exhaust from the front portion of the chamber 21, as shown in Figure 10. The plug valve includes a stem 71 positioned within a bore 72 formed in the exhaust passage 68 which leads from the front end of the chamber 21 to atmosphere as shown in Figures 10 and 13. The stem 71 is provided at its lower end with an angular passageway 73 which upon turning of the plug by the operating handle 74 forms a continuation of the passageway 68 and offers no restriction to the exhaust passing therethrough. However, should it be desirable to restrict the exhaust, thereby retarding its escape from the chamber 21, and ultimately the forward movement of the piston 22, the stem 71 is turned by the handle so as to change the relation of the angular passageway with the exhaust passageway, thus restricting to the degree desired the exhaust from the chamber 21. When such occurs the speed at which the ratchet 33 moves, and consequently the sleeve 53, is greatly reduced. To maintain the plug, in its adjusted relation with respect to the passageway 68, the stem 71 has below its handle an outstanding flange 75, one portion of its edge being serrated as indicated at 76 and engageable by a spring pressed plunger 77 positioned within a bore formed in the casing 20.

Movement of the piston 22 continues in its forward direction until at such time the trip passageway 65 is uncovered and when such occurs motive fluid passes from the rear of the piston chamber 21 to the valve chamber 54, impinging upon the front face of the valve 23 and snapping the latter back to its second position, thus admitting air from the supply passage through the passageway 66 to the front end of the piston chamber 21, where it impinges upon the front face of the piston 22, moving the same rearwardly. At the same time fluid within the chamber 21, and on the rear side of the piston, is permitted to pass to atmosphere through the passageway 64, valve chamber 54 and to the exhaust passage or port 69.

During the rearward movement of the piston 22 the action between the fluted portions of the piston stems and the ratchets 33 and 34 is just the reverse to that previously described. As the piston 22 returns, the ratchet 33 has a tendency to rotate in a clockwise direction, but inasmuch as this is prevented by the pawl 36 a rotary movement is imparted to the piston 22 and its extensions whereupon continued movement of the piston imparts to the ratchet 34 a counterclockwise movement, the result being that no movement is imparted to the sleeve 53. This return of the piston 22 occurs almost instantly upon the introduction of fluid into the chamber 21 from the passageway 66. During the return movement of the piston 22 the trip passageway 67 is uncovered, permitting the passage of fluid from the chamber 21 to the rear face of the valve 23, snapping the valve to the position shown in Figure 10, whereupon the cycle of operation previously described repeats itself, the result being the drill is fed forwardly in substantially step by step movements. It will be noted that no means, such as that shown in Figures 12 and 13 has been provided for restricting the flow of exhaust from the piston chamber through the passageway 64 and exhaust port 69. In this period of operation it is highly desirable to have the piston return as quickly as possible.

Figure 6:
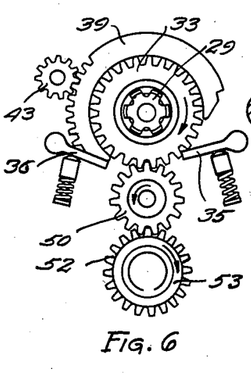
Figure 6 is a sectional view similar to Figure 4 but showing the control element for the front pawls moved to its necessary position when the fluid operated means moves the drill from its work.
Figure 7:
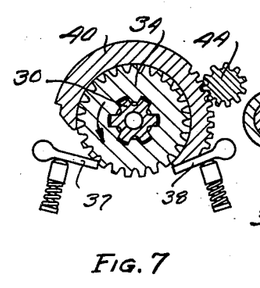
Figure 7 is a view corresponding to Figure 6 and shows the position occupied by the pawls engageable with the rear ratchet when the drill is moved from its work.

This cycle of operation continues until the steel 15 has penetrated the work to the depth required, whereupon the operator again grasps the operating lever 46 moving the control rod to the second of its functioning positions, which results in the oscillation of the shaft 45 and the ring segments 39 and 40 to the positions shown in Figures 6 and 7, permitting the pawls 36 and 38 to be moved free of the ratchet wheels 33 and 34 respectively, while the pawls 35 and 37 are free to engage the ratchets. With the pawls in this position as the piston 22 moves forward no movement is imparted to the sleeve 53, in other words when moving the drill rearwardly upon the guide shell the forward stroke of the piston becomes its quick return movement while the rearward stroke of the piston is the active or power stroke, that which imparts movement to the sleeve 53. With the parts in the position shown in Figure 10, as the piston 22 moves forwardly a slight rotary movement in a clockwise direction is given the piston inasmuch as the ratchet 33 is prevented by the pawl 35 engageable therewith. At the same time ratchet 34 is free to rotate. This action continues until the piston approaches the end of its stroke whereupon the valve 23 is tripped so that motive fluid might enter the chamber 21 and impinge upon the front face of the piston 22 moving the same rearwardly, giving to the piston its power or active stroke. During the rearward movement of the piston the ratchet 34 is prevented from rotating in a counterclockwise direction by the pawl 37 thereby causing the piston and its extensions to rotate clockwise, the result being that the ratchet 33 also rotates clockwise. Here again, the speed at which the ratchet 33 rotates is increased due to the inclination of the flutes 31. Movement of the ratchet 33 gives to the sleeve 53 a clockwise movement through the gear 50, thus returning the drill upon the shell. This cycle of operation continues until the drill has been fully returned.

Should it be desired to lock the drill against movement upon the guide shell, the shaft 45 is moved to the third of its functioning positions, whereupon the ring segments 39 and 40 are held midway between their coacting pawls 35 and 36 and 37 and 38, the result being that both pawls 35 and 36 are in contact with the ratchet wheel 33, and likewise both pawls 37 and 38 are in contact with the ratchet wheel 34. Thus movement of the piston 22 within the chamber 21 is prevented, and the drill and its feeding mechanism is locked definitely against movement.

Should an occasion arise during the operation of the drill, whereupon the operator wishes to move the drill manually upon the support, this may be accomplished by moving the operating lever 46 to either the position whereby the drill is automatically fed inwardly or the position which permits the withdrawal of the drill. Assuming that the operator has fed the drill inwardly by the feeding device and that he desires to withdraw the drill manually, the operating lever 46 is swung to the position which permits movement of the ring segments with respect to their coacting pawls as shown in Figures 6 and 7, the result being that as the drill is moved backwardly the sleeve 53 rotates upon the shaft 10 in the same direction as it does when moved by the piston 22. Movement of the sleeve 53 then rotates in a clockwise direction all parts of the feeding mechanism. Likewise, when the drill is moved forwardly by hand the lever 46 is moved to the position it assumes for such an automatic operation, then when the drill is moved forwardly upon the guide shell all parts of the feeding mechanism are rotated counterclockwise.

From the foregoing it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. The combination with a rock drill support having a guideway, of a rock drill slidable therein, a feed motor for the drill including a constantly reciprocating piston, a feed screw fixed in the support, a sleeve rotatable within the motor and engaging the feed screw, means transmitting motion from the piston to the sleeve for moving the drill with respect to the support, and selectively controlled means including the piston for controlling the directional rotation of the sleeve.

2. The combination with a rock drill support having a guideway, of a rock drill slidable therein, a feed motor for the drill including a constantly reciprocating piston, a screw fixed in the support, a rotatable element carried by the motor and engaging the screw for feeding the drill longitudinally of the support, means transmitting motion from the piston to the rotatable element, and selectively controlled means including the piston for controlling the directional rotation of the element.

3. A drilling unit comprising a pair of fluid operated motors each having a piston, one for striking the steel and the other for imparting motion to the unit, a support for the unit, a threaded element fixed longitudinally of the support, a rotatable sleeve carried by the unit and surrounding said element, means actuated by the motion imparting piston for rotating said sleeve about the element, and means including the motion imparting piston for controlling the directional movement of the sleeve about the element.

4. A drilling unit comprising a pair of fluid operated motors each having a piston, one for striking the steel and the other for imparting motion to the unit, a support for the unit, a threaded screw fixed longitudinally of the support, a rotatable sleeve carried by the unit and surrounding said screw, a pair of ratchets splined to the motion imparting piston for transmitting motion therefrom to the sleeve, pawls selectively engageable with the ratchets for controlling their directional movement, and means associated with the pawls for controlling engagement with the ratchets.

5. A drilling unit comprising a pair of fluid operated motors each having a piston, one for striking the steel and the other for imparting motion to the unit, a support for the unit, a feed element carried by the support, a member carried by the unit and rotatable longitudinally of the feed element, means actuated by the motion imparting piston for moving said member with respect to the feed element, and selectively controlled means including the motion imparting piston for controlling the directional movement of the member with respect to the feed element.

6. The combination with a rock drill support having a guideway, of a rock drill slidable therein, a feed motor for the drill including a constantly reciprocating piston, a feed screw fixed in the support, a sleeve rotatable within the motor and engaging the feed screw, a pair of ratchets rotatable at certain movements of the piston, means transmitting motion from one of the ratchets to the sleeve, and selectively controlled means engageable with the ratchets for controlling directional rotation of the sleeve.

7. The combination with a rock drill support having a guideway, of a rock drill slidable therein, a feed motor for the drill including a constantly reciprocating piston, a feed screw fixed in the support, a sleeve rotatable within the motor and engaging the feed screw, means transmitting motion from the piston to the sleeve, said means including a pair of ratchets, one of which is directly connected to the sleeve, and selectively controlled means movable to several positions for controlling the directional rotation of the sleeve.

8. The combination with a rock drill support having a guideway, of a rock drill slidable therein, a feed motor for the drill including a constantly reciprocating piston, a feed screw in the support, a sleeve rotatable within the motor and engaging the feed screw, a ratchet splined to the piston serving to transmit motion therefrom to the sleeve, and pawls coacting with the ratchet to control its directional movement.

9. The combination with a rock drill support having a guideway, of a rock drill slidable therein, a feed motor for the drill including a constantly reciprocating piston, a threaded member fixed longitudinally of the support, a sleeve movable with the motor and coacting with the member, a pair of ratchets splined to the piston, one of said ratchets imparting rotary movement to the piston during its reciprocation, the other of said ratchets by the rotary and reciprocating movements of the piston serving to transmit motion from the piston to the sleeve, and selectively controlled means for controlling the directional rotation of the ratchets.

10. The combination with a rock drill support having a guideway, of a rock drill slidable therein, a feed motor for the drill including a reciprocatory piston, a valve controlling the movement of the piston, a member fixed longitudinally of the support, a movable sleeve supported by the motor and coacting with the member, a pair of ratchets splined to the piston and serving to alternately impart oscillations to the piston during its reciprocatory movement, one of said ratchets imparting movement to the sleeve, and means including the piston for controlling the directional movement of the last said ratchet.

11. A drill unit comprising a pair of fluid operated motors each having a piston, one for striking the steel and the other for imparting motion to the unit, a support for the unit, a movable element carried by one of the motors and engageable with the support, said motion imparting piston having oppositely extending fluted stems, a ratchet on each stem and serving to oscillate the piston during its normal movement, one of said ratchets engageable with the element for imparting movement thereto with respect to the support, and pawls engageable with the ratchets for controlling the directional movement of the element.

12. A drill unit comprising a pair of fluid operated motors each having a piston, one for striking the steel and the other for imparting motion to the unit, a support for the unit, a member carried by the motion imparting motor and engageable with the support, said motion imparting piston having spirally fluted portions extending in opposite directions, a ratchet engageable with each of said portions, one of said ratchets serving to impart oscillatory movement to the piston during its reciprocations, the other of said ratchets transmitting motion from the piston to the support engaging member, selectively operated pawls for controlling the directional movement of the member, and the speed at which the member moves being determined by the inclination of the piston flutes in combination with the reciprocation of the piston.

13. A drilling unit comprising a pair of fluid operated motors each having a piston, one for striking the steel and the other for imparting motion to the unit, a support for the unit, a member carried by the motion imparting motor and engageable with the support, means operable by the motion imparting piston for transmitting motion intermittently to the member, and means coacting with the first said means for controlling the directional movement of the member.

14. The combination with a rock drill support having a guideway, of a rock drill slidable therein, a feed motor for the drill including a cylinder having therein a piston, a valve controlling the flow of fluid to and the exhaust from alternate sides of the piston during its reciprocation, a rotatable member supported by the cylinder and engageable with the support, ratchet means connected to the piston for imparting motion to the member, pawls engageable with the ratchets to prevent retrograde movement of one while the other imparts motion step by step to the member, and manually actuated means controlling the movement of the piston during the period movement is transmitted to the member.

15. A drilling unit comprising a pair of fluid operated motors each having a piston, one for striking the steel and the other for imparting motion to the unit, a support for the unit, a member carried by the motion imparting motor and engageable with the support, means operable by the motion imparting piston for transmitting motion intermittently to the member, and means controlling the speed at which said piston operates varying the intervals at which motion is transmitted.

16. A drilling unit comprising a pair of fluid operated motors each having a piston, one for striking the steel and the other for imparting motion to the unit, a valve controlling the flow of fluid to and the exhaust from alternate sides of the last said piston during its reciprocation, a support for the unit, a member carried by the motion imparting motor and engageable with the support, means operable by the motion imparting piston for transmitting motion intermittently to the member, and selectively controlled means regulating the exhaust and subsequently the movement of the piston and the intervals at which motion is transmitted.

17. The combination with a rock drill support having a guideway, of a rock drill slidable therein, a feed motor for the drill including a constantly reciprocating piston, a member carried by the support, a rotatable element carried by the motor and coacting with said member for feeding the drill longitudinally of the support, said element being rotated during the movement of the piston, selectively controlled ratchet mechanism causing the rotation of the piston during its movement, and said mechanism serving to control the directional rotation of said piston for moving the drill in one or the other direction relative to the support.

GUSTAV C. PEARSON.